United States Patent [19]

Dise

[11] 4,395,641

[45] Jul. 26, 1983

[54] POINT OF OPERATION SAFETY DEVICE

[75] Inventor: Ronald S. Dise, Dublin, Pa.

[73] Assignee: Penn Engineering & Manufacturing Corp., Danboro, Pa.

[21] Appl. No.: 290,397

[22] Filed: Aug. 5, 1981

[51] Int. Cl.³ .......................... H01H 3/16; F16D 9/00; B30B 15/14
[52] U.S. Cl. ...................................... 307/116; 100/53; 192/134; 200/61.42
[58] Field of Search ............... 100/226, 53; 200/61.42; 192/130, 134; 307/116

[56] References Cited

U.S. PATENT DOCUMENTS

| | | | |
|---|---|---|---|
| 3,129,799 | 4/1964 | Dean et al. | 100/53 X |
| 3,315,049 | 4/1967 | Cain | 200/61.42 |
| 3,487,182 | 12/1969 | Grundy | 192/134 X |
| 3,939,314 | 2/1976 | Loeser | 200/61.42 |

Primary Examiner—Donald A. Griffin

Attorney, Agent, or Firm—Joseph G. Denny, II; Peter J. Patane

[57] ABSTRACT

A point of operation safety device for hydraulic or pneumatic presses. The safety device includes a probe which descends by gravity toward the work area when the operator initiates the cycle. If during the descent of the probe no obstruction is encountered and the probe sufficiently enters the work area, a limit switch is automatically closed by the probe shaft to energize the control circuit of the press.

Switch means are provided for retracting the ram of the press if the operator pushes up on the probe after the cycle has started. Relay means are provided to prevent the press from recycling at the end of one cycle, unless the operator again closes the circuit of the safety device. Further, a box construction is provided to jam the probe assembly to prevent initiation of the cycle when the cover to the box which houses the safety device is in the open position.

10 Claims, 9 Drawing Figures

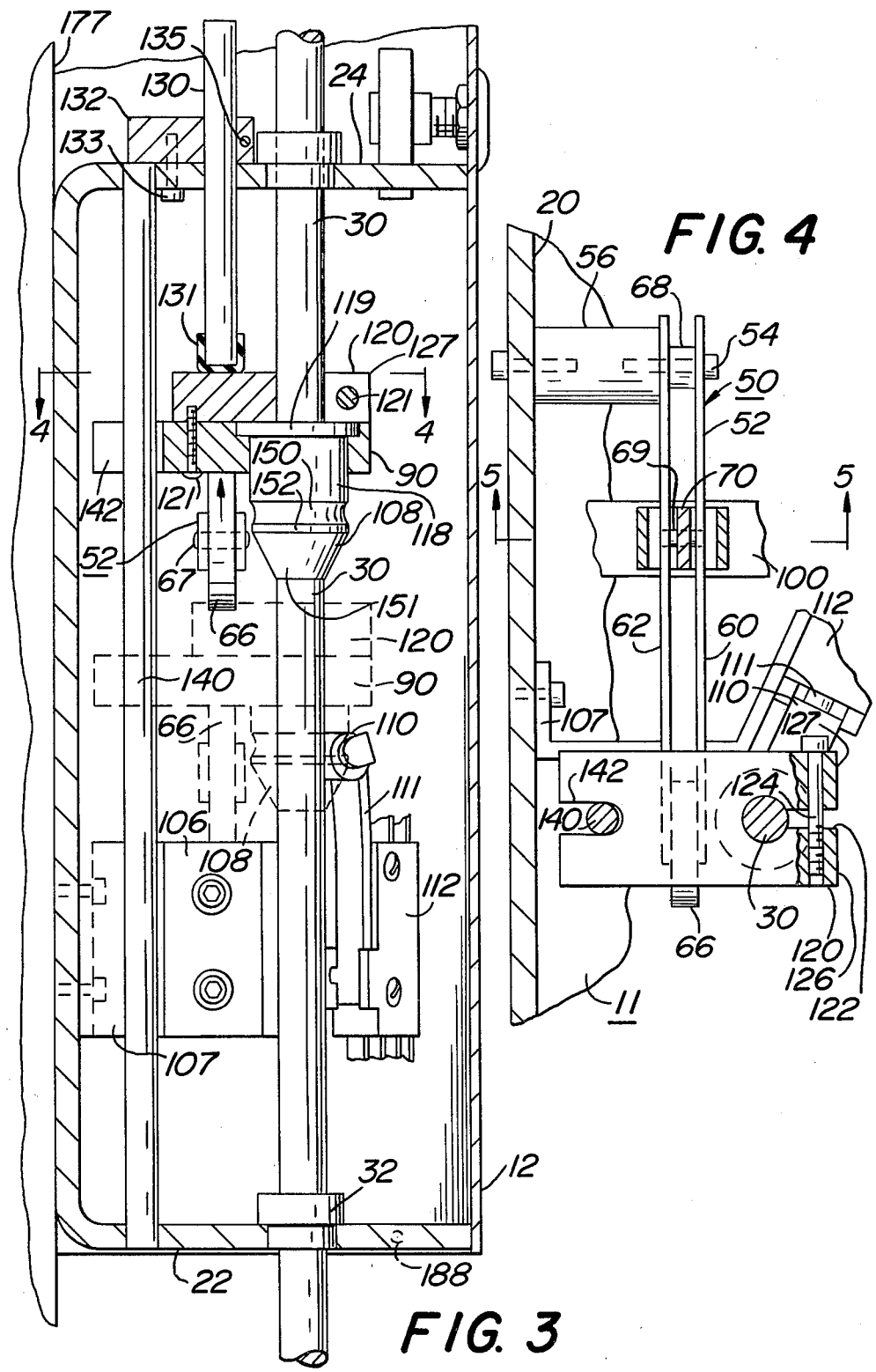

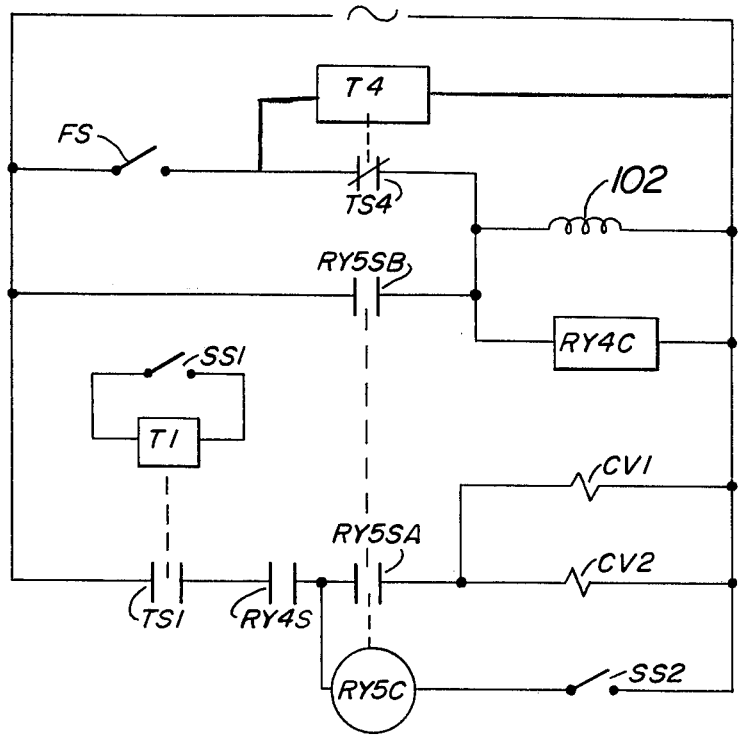
FIG. 7
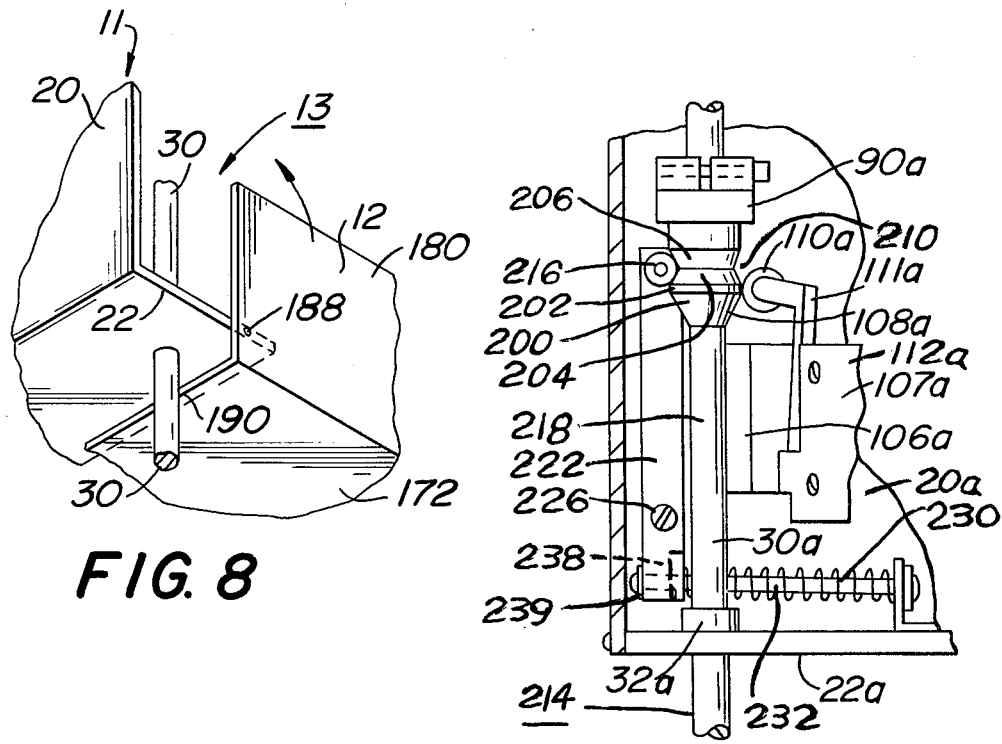
FIG. 8
FIG. 9

POINT OF OPERATION SAFETY DEVICE

BACKGROUND OF THE INVENTION

This invention relates to point of operation safety devices for machines such as presses, spot welders, riveters and the like, having a ram which is forcefully moved to engage a workpiece upon command of an operator, for example, a press for installing fasteners or the like into sheeted plates. Point of operation safety devices of this type are disclosed in U.S. Pat. Nos. 3,315,049, 3,487,182 and 3,939,314.

All of the point of operation safety devices known to me for use on such machines before my invention hereof test or sense the work area with a probe prior to initiation of the cycle of the machine and allow the cycle to initiate only if no obstruction is detected by the probe in the work area. However, these previously known safety devices do not provide for halting or reversing the downward travel of the ram after its downward stroke has been initiated by the control circuit of the machine. This is a potentially dangerous condition, because in many such machines the workpiece is hand held by the operator and is occasionally not properly positioned when the cycle of the machine is started by the operator. When this occurs and is noted by the operator, the operator will sometimes try to re-position the workpiece before it is contacted by the ram.

If the operator does not succeed in properly repositioning the workpiece, and if there is no provision for stopping the downward stroke of the ram, injury to the operator and/or damage to the workpiece may result. The safety device of the present invention provides an electrical circuit arrangement in combination with the electrical control circuit for the electrical solenoid valves of the hydraulically or pneumatically controlled machines which will stop and/or reverse the downward stroke of the ram during any part of the cycle of the machine. If the control circuit valves are spring biased to the reverse position, the ram will be reversed by the circuit arrangement of this invention. However, if the control circuit valves are spring biased to a stop position for the ram, the ram will be stopped by the circuit arrangement of this invention.

It is desirable to stop and or reverse the downward stroke of the ram during any part of the cycle of the machine and this invention is directed toward doing so simply by raising the probe which is used to sense an obstruction in the patch of the ram. In addition, it is also desirable to stop and/or reverse the stroke of the ram by having the operator push up or down on the probe and in a modification of this invention an arrangement is provided whereby if the operator pushes either down or up on the probe the control circuit of the safety device will signal the control circuit of the press to stop or reverse the stroke of the ram.

SUMMARY OF THE INVENTION

It is an object of this invention to provide a point of operation safety device for machines such as presses which is of improved efficiency.

The safety device includes a loop which extends around the punch (carried by the ram) and the loop is attached to a probe shaft which protrudes from the safety device. The loop is adjusted so that it is slightly above the workpiece when the probe shaft is at the bottom of its stroke. When the safety device is activated by the operator, the probe shaft is allowed to drop by gravity toward the workpiece. If the loop is unobstructed, the probe shaft will complete its stroke and trip a limit switch which actuates a timer of the press control circuit to initiate the cycle of the press. If an obstruction, such as an operator's finger, is encountered by the loop, the probe shaft will not complete its downward stroke, thereby not tripping the limit switch and the press will not commence its cycle.

Circuitry is included to hold the loop down near the workpiece during the cycle of the press. As an added safety feature, the power to the coils of the electrical solenoid valves of the hydraulic circuit of the press is routed through the safety device. If, at any time during the cycle, the probe shaft is manually lifted, the power to the coils of the solenoid valves will be terminated, whereby the solenoid valves will reverse (due to their spring bias), causing the ram to retract. When this occurs the press cannot be recycled until the timer controlling the press cycle completes its predetermined time period and thereafter the foot switch is reactuated.

BRIEF DESCRIPTION OF THE VIEWS

FIG. 3 is a sectional view taken along the line 3—3 in FIG. 1;

FIG. 4 is a sectional view taken along the line 4—4 in FIG. 3;

FIG. 7 is a circuit diagram for this safety device;

FIG. 8 is a partial bottom perspective view of this safety device showing the cover fully open with a portion of the cover abutting the shaft (for supporting the probe) so as to restain its downward travel at such time; and FIG. 9 shows a modified safety device in which the switch cam has been modified to provide for returning the ram of the press whether the shaft (for supporting the probe) is pushed up or down.

DESCRIPTION OF THE PREFERRED EMBODIMENT

Figure 1:
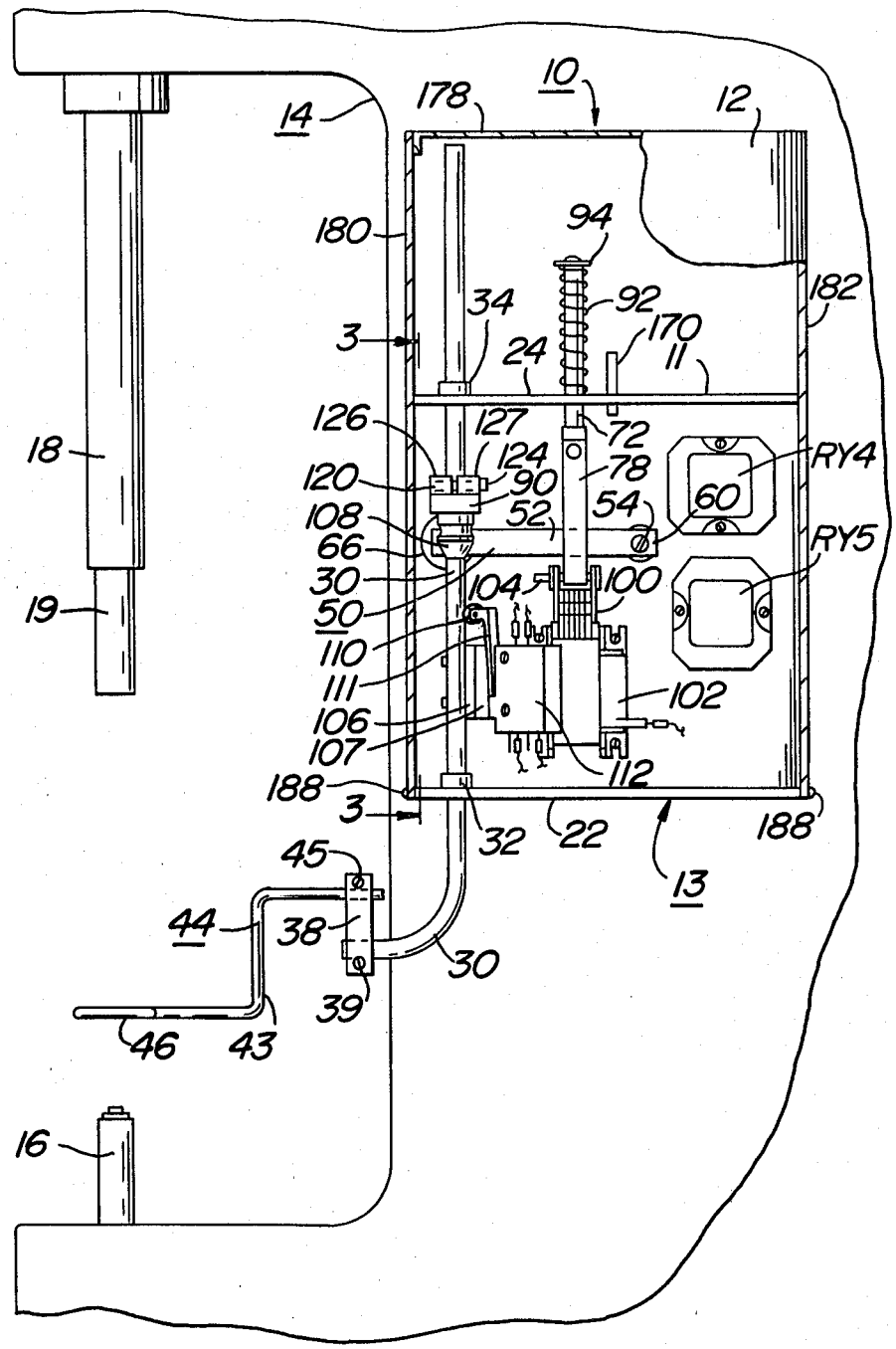
FIG. 1 is a front elevation of the point of operation safety device embodying this invention, the safety device being installed on a press and the cover of the safety device being broken away to show the interior thereof.

Referring to the drawings, FIG. 1 illustrates the point of operation safety device 10 in elevation. The safety device 10 includes a box 13 formed by a frame plate 11 and a cover 12, the latter being broken away in FIGS. 1 and 2 for illustrative purposes.

Figure 2:
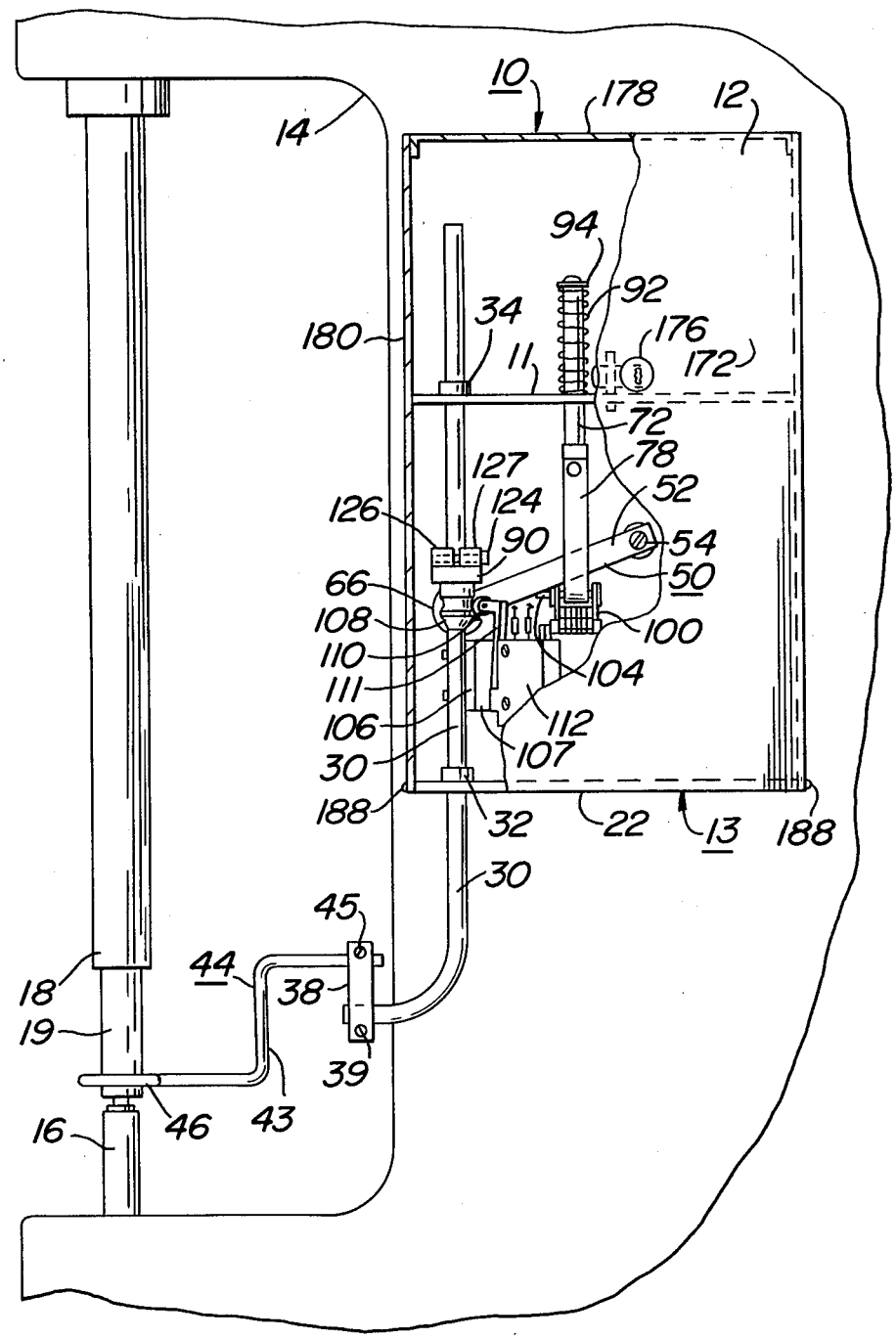
FIG. 2 is a view similar to FIG. 1 but showing the safety device in its lowermost position.

The frame plate 11 is mounted on the side of a press 14, as shown in FIGS. 1 and 2, by suitable means not shown. The press 14 includes an anvil 16 for supporting a workpiece (not shown) and a ram 18 to which is secured a punch 19. The frame plate 11 has a U-shape defined by a base 20 and legs 22 and 24.

Figure 6:
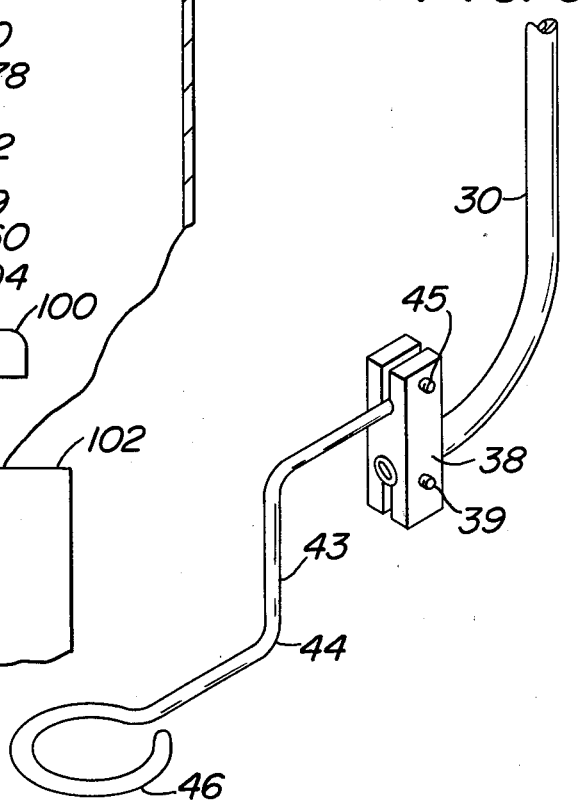
FIG. 6 is a top perspective view of the probe and a portion of its supporting shaft.

Slidably secured to the legs 22 and 24 is a probe shaft 30 which extends through suitable bearings 32 and 34 secured to the legs 22 and 24, respectively. The probe shaft 30 is suitably curved toward the work area between the anvil 16 and the punch 19 and carries a vertical clamp 38. The clamp 38 has a slotted lower portion, into which an end portion of the probe shaft 30 is received and to which it is secured by a suitable screw 39, all as shown in FIG. 6. The upper portion of the clamp 38 is also slotted, as shown in FIG. 6, and receives an end portion of a probe 44 to which it is secured by a further screw 45. As shown in FIG. 2, the probe 44 may have a stepped down portion 43, as shown, and a coiled loop 46 at its forward end of large enough diameter so that the punch 19 may extend through it to engage the fastener (not shown) so that the fastener may be pressed by the punch 19 into the sheeted plate (not shown) which would be resting upon the anvil 16. The probe 44 may, of course, have other shapes to accommodate the shape of the sheeted plate (not shown). The probe 44 and the probe shaft 30 may be made integral, eliminating the clamp 38 in which event adjustment of the probe shaft 30 and probe 44 would be made inside the box 13. The probe shaft 30 is held in its upper position and raised thereto, the position shown in FIG. 1, by a linkage assembly 50. The linkage assembly 50 comprises a pivotal beam 52 pivoted about a pin 54 carried by a support 56 which is secured to and spaced from the base 20 of the frame plate 11, as shown in FIG. 4.

The beam 52 comprises front and rear arms 60 and 62 spaced apart as shown in FIG. 4 between which is secured a circular disc 66 by a suitable fastener 67, as shown in FIG. 3. The arms 60 and 62 are also secured to and held in spaced relation by a bushing 68 through which the pin 54 extends, see FIG. 4. A further spacer 69, having its ends suitably secured to the arms 60 and 62, provides a pivot for a generally vertically extending pivotal arm 70, FIG. 5. In FIG. 1, the upper position of the probe shaft 30 and the probe 44, the beam 52 is shown generally horizontally disposed and only the front arm 60 is seen.

Figure 5:
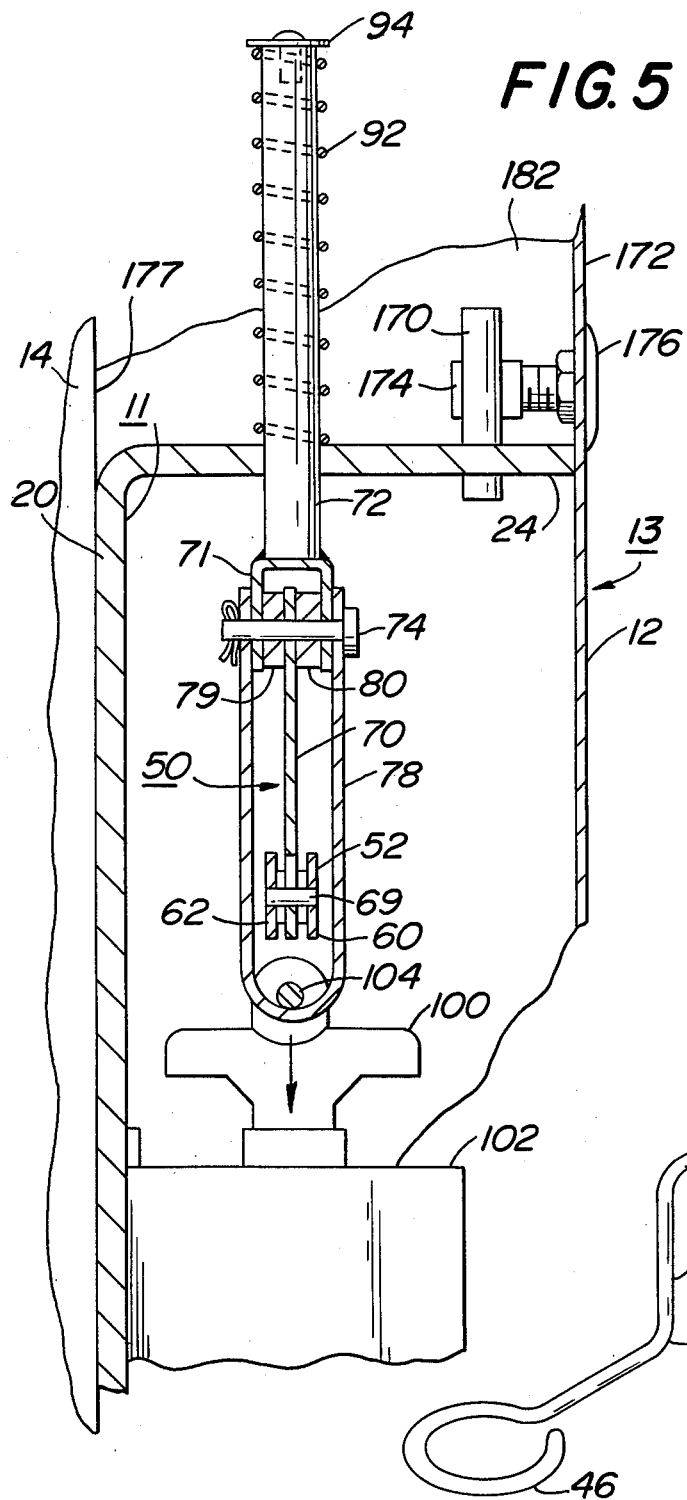
FIG. 5 is a sectional view taken along the line 5—5 of FIG. 4.

As best seen in FIG. 5, the beam 52 is connected by the generally vertical pivotal arm 70 to a clevis 71 of inverted U-shape, the clevis 71 being suitably secured to the bottom of a rod 72 by brazing or the like. The connection between the arm 70 and the clevis 71 is provided by a pin 74. The rod 72 extends through and above the leg 24, as shown in FIGS. 1, 2 and 5.

A longer U-shaped clevis 78 is also pivotally connected to the shorter clevis 71 by the pin 74. The longer clevis 78 straddles the beam 52 and the vertical arm 70 lies between the opposed legs of the longer clevis 78. The end portions of the legs of the longer clevis 78 abut the outer surfaces of the legs of the shorter clevis 71 and are slidable thereon. Preferably spacers 79 and 80 are provided upon the pin 74 to centrally space the vertical arm 70 between the legs of the shorter clevis 71. The pin 74 may have an enlarged head at one end and a hole at the other end to receive a cotter pin, to secure the various parts together, see FIG. 5.

As shown in FIGS. 1 and 3 the circular disc 66 bears against the underside of a block 90 which is carried by the probe shaft 30 to hold the probe shaft in its upper position (FIG. 1) and to raise the probe shaft 30 to its upper position by virtue of a coil compression spring 92 disposed around the rod 72 and compressed between the upper surface of the leg 24 and an overhanging washer 94 secured to the upper end face of the rod 72 by a suitable screw. Thus, the force of the spring 92 pulls up on the two clevises 71 and 78 and the arm 70 tending to rotate the beam 52 clockwise about the pivot 54 to its upper position.

The longer clevis 78 is actuated by an armature 100 of an electrical solenoid 102 through a pin 104 which abuts the base of the U-shaped longer clevis 78 as shown in FIGS. 1 and 5. When the longer clevis 78 is in its upper position, the position shown in FIG. 5, the pin 104 rests upon the base of the longer clevis 78. When the solenoid 102 is energized, the armature 100 is pulled down, causing the pin 104 to pull down on the base of the longer clevis 78, whereupon the longer clevis 78 pulls the shorter clevis 71 down by virtue of the pin 74 connecting the two against the force of the spring 92 further compressing the latter. Since the vertical arm 70 is connected between the two clevises 71 and 78 and the beam 52, the beam 52 is rotated counterclockwise at such time, to the position in FIG. 2 whereupon the circular disc 66 is lowered from the upper position shown in FIG. 1 to the lower position shown in FIG. 2, until the circular disc 66 abuts a stop 106. In FIG. 3 the upper position of the disc 66 is shown in solid lines and the lower position is shown in dotted lines.

When the circular disc 66 is so lowered, the probe shaft 30 and probe 44 become free to descend under the influence of gravity from the upper position shown in FIG. 1 to the lower position shown in FIG. 2. Simultaneously, the coil compression spring 92 is further compressed due to the fact that the shorter clevis 71 is secured to the rod 72 and as the shorter clevis 71 moves down it carries with it the rod 72.

As shown in FIGS. 1, 2 and 3, the probe shaft 30 carries a cam 108 for actuating a limit switch 112 having two sets of contacts SS1 and SS2. The limit switch 112 and the stop 106 are both secured to a bracket 107 which in turn is secured to the base 20, as shown in FIGS. 3 and 4. When the probe shaft 30 descends to a predetermined position into the work area the cam 108 engages the roller 110 on the leaf actuator 111 of the limit switch 112, as long as the probe 44 encounters no obstruction during its descent to the predetermined position in the work area.

Such actuation of the limit switch 112 closes its contacts SS1 and SS2 to energize the control circuit of the press 14. Thereafter, the ram 18 and the punch 9 descend into the work area.

If an obstruction in the work area, such as the operator's hand, presents itself to the probe 44, the probe 44 will be prevented from descending sufficiently for the shaft 30 to carry the cam 108 into engagement with the roller 110 and the limit switch 112 will not be actuated, so that at such time the control circuit (not shown) of the press 14 will not be actuated.

To initiate a cycle of the press 14, the foot switch FS (shown diagrammatically in FIG. 7) is depressed by the operator to close the switch FS. When the foot switch FS is closed a coil RY4C of relay RY4 (FIG. 1) is energized at such time. Energization of the coil RY4C simultaneously closes the switch contacts RY4S (FIG. 7) and energizes the safety solenoid coil 102, pulling down the armature 100 and simultaneously pivoting the beam 52 counterclockwise (FIGS. 1 and 2) until the disc abuts the stop 106. Rotation of the beam 52 lowers the disc 66 away from the block 90, whereupon the probe shaft 30 is permitted to drop, closing the two sets of switch contacts SS1 and SS2 of the limit switch 112.

Closure of the switch contacts SS1 activates the timer T1 initiating the cycle of the press 14. The hydraulic and electrical control circuit of the press is shown in detail in U.S. Pat. No. 3,465,410. The timer T1 shown diagrammatically herein corresponds generally to the timer A described in U.S. Pat. No. 3,465,410. The timer T1 requires only contact closure to activate it, power being supplied to the timer T1 through terminals not shown, as is well known in the art. Activation of the timer T1 closes the switch contacts TS1 and since the switch contacts RY4S and SS2 have already been closed, the circuit to the relay coil RY5C is now complete. Energization of the relay coil RY5C closes the contacts RK5SA, whereupon power flows to the coils CV1 and CV2 of the two hydraulic solenoid valves with which they are associated to actuate the hydraulic circuit (not otherwise shown) of the press 14.

The energization of the coil RY5C also causes the switch contacts RY5SB to close, whereupon another circuit is completed to the safety solenoid coil 102 to hold the latter and the coil RY4C energized even if the foot switch FS or the timer switch TS4 open.

After a predetermined time period the time T1 times out and the switch contacts TS1 open, whereupon current to the coil RY5C is interrupted, causing the switch contacts RY5SA and RY5SB to open. When the switch contacts RY5SB open, the circuit to the safety solenoid coil 102 becomes deenergized, whereupon the armature 100 and the clevis 78 are moved upwardly by the force of the spring 92. Movement upwardly of the armature 100 and of the clevis 78 also moves upwardly the vertical arm 70 which by virtue of its connection at the spacer 69 to the beam 52 causes the latter to rotate clockwise about the pin 54 causing the disc 66 to lift the block 90 and thereby to raise the probe shaft 30.

If after the limit switch 112 has been actuated and the cycle is in process, the operator wants to stop the press for any reason, he may push up on the probe 44. When the probe 44 is pushed up it will move up freely and when the cam 108 releases the roller 110 of the limit switch 112, the switch contacts SS2 will open, deenergizing the coil RY5C, opening the contacts RY5SA which results in the circuit being opened to the coils CV1 and CV2 of the hydraulic solenoid valves (not shown) of the press hydraulic circuit, which causes the ram 18 and punch 19 to retract. Simultaneously, the switch contacts RY5SB will open, deenergizing the safety solenoid coil 102 and the relay coil RY4C. The timer T4 of the press control circuit has previously caused the normally closed switch TS4 to open, because the timer T4 is set to open the switch TS4 at the end of a time period which is long enough to permit the probe shaft 30 to drop to its lower position, but shorter than the time period of one cycle of the press to prevent a new cycle from automatically starting at the end of the first cycle, even if the operator should keep the foot switch FS closed. Since the coil RY4C has been deenergized, the switch RY4S is open and if thereafter the probe shaft 30 is pulled down to actuate the roller 110 and to thereby close contacts SS1 and SS2 of the limit switch 112, the cycle of the press will not restart until the foot switch FS is again actuated, because the circuit to the relay coil RY5C will be open due to the open switch RY4S.

The switch cam 108 is carried by the block 90 as best shown in FIG. 3, by an integral extension 118 and a radial flange 119 which is trapped between the block 90 and a clamp 120. The block 90 is secured to the clamp 120 by suitable screws 121, FIG. 3. The clamp 120 has a slot 122 and a screw 124 extends through the clamp 120 to draw the arms and 126 and 127 tight against the shaft 30, so that the subassembly comprising the switch cam 108, the block 90 and the clamp 120 may be secured to the shaft 30 at various positions along the probe shaft 30 and the probe shaft may be rotated relative to the clamp 120 whose rotation is restricted by a guide rod 140, FIG. 3. The switch cam 108 is circular in shape, as shown, and is freely rotatable about the shaft 30 so that the roller 110 does not bear on any one particular surface of the switch cam 108 continuously, thus distributing wear over a large cam surface.

Upward movement of the clamp 120, and hence of the shaft 30, is limited by an adjustable stop rod 130 which extends through the leg 24 and is secured to a clamp 132 fastened to the leg 24 by screws 133. Preferably a rubber boot 131 is provided on the lower end of the rod 130. The rod 130 is slidable through the leg 24 and clamp 132 and is secured to the clamp 132 by a screw 135 which extends through the arms of the clamp 132.

The guide rod 40 has its ends secured to the lower and upper legs 22 and 24. The block 90 has a guide slot 142 through which the rod 140 extends to provide guidance to the block 90 and thereby to the probe shaft 30.

The switch cam 108 is preferably provided with a tapered cylindrical surface 151, FIG. 3, upon which the roller 110 rides to actuate the contacts SS1 and SS2 and an annular land 152 to provide overtravel for the actuator 111, the land 152 having the largest diameter. Above the land 152 is a groove 150 and the roller 110, when the probe shaft 30 is in its lower position, preferably rests on the tapered surface of the groove immediately above and adjacent to the land 152 to provide a vertical force component upon the probe shaft 30 which tends to stabilize the probe shaft 30 against bounce thereof.

Referring to FIGS. 1, 2 and 5, the cover 12 of the box 13 extends above the leg 24 as shown. The cover 12 further includes top margins 178, FIGS. 1 and 2, and two side margins 180 and 182. The leg 24 is provided with a catch 170 in the form of a vertical post secured to the leg 24. The corresponding part of the front 172 of the cover 12 is provided with a latch 174 actuated by a key lock 176. Since the box 13 is placed against the side 177 of the press 14, the side 177 of the press 14 above the leg 24 serves to close off the back of the box 13 bounded by the leg 24 and the top margin 178.

Referring to FIGS. 1 and 8, the side margins 180 and 182 are pivoted to the lower leg 22 by hinge pins 188 which are carried by and secured to the leg 22 and extend through suitable holes in the margins 180 and 182. The hinge pins 188 may be provided with suitable enlarged heads to retain the margins 180 and 182 to the leg 22. The pins 188 are so placed relative to the front face 172 and the part of the probe shaft 30 which extends below the leg 22 so that when the cover 12 pivots down to provide access to the interior of the box 13, an edge margin 190 will engage the probe shaft 30, as shown in FIG. 8, and restrain the probe shaft 30 from being pulled down manually, tending to prevent inadvertent initiation of a cycle of the press. Preferably, the cover 12 pivots down until it assumes a position slightly below horizontal, the position partially shown in FIG. 8. Thus, it is seen that the weight of the cover 12 is imposed at the edge margin 190 upon the probe shaft 30 to restrain movement up or down of the probe shaft 30 so as to also restrain the cam 108 from inadvertently actuating the limit switch 112.

From the foregoing it is seen that while the cover 12 is in the position shown in FIG. 8, even if the foot switch FS is actuated and the solenoid 102 becomes energized pulling down the armature 100 and the disc 66 away from the block 90, the probe shaft 30 will not drop and, hence, the cam 108 will not actuate the limit switch 112, and the press will not operate. Thus, the cover 12 by so engaging and in effect jamming the probe shaft 30 from dropping keeps the press from being actuated at such time.

Referring to FIG. 9, a modified cam 108a is shown for opening the contacts of the limit switch 112a. The cam 108a comprises a first inclined surface 200, followed by a narrow land 202, followed by a second inclined surface 204, which is followed by a third inclined surface 206. The last two inclined surfaces 204 and 206 together form a detent 210.

The cam 108a is engaged by a follower 216 carried by an arm 222 suitably pivoted at its lower end portion on a pivot 226 secured to the base 20a. The arm 222 is at all times biased clockwise about the pivot 226 by a compression spring 230 carried on a guide rod 232, thus biasing the follower toward the probe shaft 30a and against the cam 108a. The rod 232 is fixedly secured at the right (FIG. 9) to a bracket 234 secured to the leg 22a. The rod 232 extends at the left (FIG. 9) through a bracket 238 carried by the arm 222, so that the arm 222 is freely movable relative to the rod 232. The compression spring 230 is compressed between the brackets 234 and 238. The guide rod 232 carries a collar 239 to limit clockwise rotation of the arm 222.

When the operator closes the foot switch to start a cycle of the press, the probe assembly 214 will drop by gravity, as discussed in detail in connection with FIGS. 1 to 8. As the probe assembly 214 approaches the bottom of its stroke the (spring loaded) follower 216 will contact the first inclined surface 200 of the cam 108a and will apply an upward force to the probe assembly 214. This upward force will tend to brake the descent of the probe assembly 214. However, the probe assembly 214 will have enough downward momentum to continue its downward movement until the (spring loaded) follower 216 has completely traversed the first inclined surface 200 and the land 202 and is in the detent 210 and in contact with the second inclined surface 204. In this position, the force of the spring 230, in combination with the inclined surface 204, will apply a downward force to the probe assembly 214, causing it to continue its downward movement until the (spring loaded) follower 216 becomes centered in the detent 210. The vertical distance between the center of the detent 210 and the center of the land 202 is approximately equal to the vertical distance between the center of the spring loaded follower 216 and the center of the switch roller 110a. Therefore, when the follower 216 is centered in the detent 210 the switch roller 110a is centered on the land 202, as shown in FIG. 9, and the limit switch 112 is adjusted so that its contacts are closed in this position.

From this position the switch contacts of the limit switch 112 may be opened (thereby reversing the ram and punch of the press) by either raising or lowering the probe assembly 214. If the probe assembly 214 is raised, the contacts of the limit switch 112 will be opened by the first inclined surface 200. If the probe assembly 214 is lowered, the contacts will be opened by the second inclined surface. A stop 106a is provided to prevent the probe assembly 214 from being lowered far enough down to allow the switch roller 110a to contact the third inclined surface 204. The stop 106a is necessary to prevent re-closure of the contacts of the limit switch by the third inclined surface 206. The stop 106 is engaged by the disc 66 (shown in FIG. 3) and the block 90a (carried by the probe shaft) engages the disc 66 to prevent sufficient movement downward of the probe shaft as would cause the third surface 206 to cause the roller 110a to actuate the limit switch 112a.

In all other respects the embodiment shown in FIG. 9 would be constructed in accordance with FIGS. 1 to 8.

From the foregoing it is seen that the probe shaft 30, the solenoid 102, the spring 92 and the rod 72, the clevises 71 and 78 the arm 70 and the pin 104 are all on the same side of the pivot pin 54. This arrangement results in radial forces which are applied to the pivot pin 54 and bending moments which are applied to the beam 52 which are inherently lower, as compared to other known arrangements.

Further, the arrangement of the spring 92, the rod 72 and the clevises 71 and 78 together with the arm 70 and pin 104 minimizes the side component of force, the side thrust, applied to the solenoid armature 100, thus reducing the tendency of the armature 100 to bind within the solenoid 102.

Also, the spring 92 is preferably made of a low stiffness with high compression which reduces the cyclic component and thereby increases spring fatigue life. The use of a compression spring also eliminates the hooks which are required on the ends of extension springs and the stress concentrations and resulting fatigue failure associated with these hooks.

Since the disc 66 is mounted on the beam 52 by a fastener 67, it may be rotated by loosening and retightening the fastener 67 to present a new surface in the block 90 and the stop 106. Likewise, the rotatable cam 108 will present different surfaces to the roller 110. Thus, a longer service life is insured.

The circuit provided by the arrangement shown in FIG. 7 avoids the possiblity that the operator may defeat the safety device by tying down the probe 44 and probe shaft 30 in a position which would keep the limit switch contacts SS1 and SS2 closed. If the operator actuates the foot switch FS and when the probe 44 and probe shaft 30 descend to their lower position, he ties them down so as to keep the limit switches SS1 and SS2 closed, i.e., he prevents the probe 44 and probe shaft 30 to return to their upper position, when the timer T1 times out, the contacts TS1 will return to the open position. The timer T1 is such that it will not reclose the contacts TS1 until the contacts SS1 are opened and then reclosed. With the switch contacts TS1 open, the solenoid valves CV1 and CV2 will not be reenergized even if thereafter the operator recloses the foot switch FS.

Alternatively, if the operator pulls down the probe 44 and probe shaft 30 (without first activating the foot switch FS), the limit switch contacts SS1 and SS2 will be closed. If thereafter he closes the foot switch FS, this will energize the relay coil RY4C and close the contacts RY4S, whereupon the solenoid valves CV1 and CV2 will be energized and the press will go through one cycle. Thereafter the switch contacts TS1 will be reopened by the times T1 and if the operator again actuates the foot switch FS no further cycling of the press will take place because the timer T1 has opened the switch contacts TS1 which will not reclose until the switch contacts SS1 open and then reclose.

It should be noted that the timer T1 is of the type which has a source of electrical power (not shown in FIG. 7) and which is activated by the closing of switch contacts SS1, and which cannot be reactivated until the switch contacts SS1 are opened and then reclosed for reactivation of the timer T1, i.e., reclosing of the contacts TS1.

What I claim is:

1. A point of operation safety device for a press having a control circuit comprising
   a probe means for sensing an obstruction,
   a shaft carrying said probe means,
   said shaft being movable up and down between upper and lower positions,
   a switch actuated by said shaft when said shaft is in its lower position,
   a beam movable between upper and lower positions to bias said shaft upwardly and hold said shaft in said upper position,
   spring return means for said beam,
   said beam being in an upwardly force transmitting relationship with said shaft at one end portion and pivotally mounted at the other end portion,
   an arm having a lower portion pivotally connected to said beam between the end portions of said beam,
   said arm having an upper portion pivotally connected to said spring return means, and
   electrical solenoid means connected to said spring return means,
   whereby when said electrical solenoid means is energized said beam is rotated downwardly out of force transmitting relationship with said shaft and said shaft falls by gravity to its second position to actuate said switch and initiate the operation of said control circuit of said press.

2. In combination,
   a press having an electro-hydraulic control circuit including solenoid controlled valves, and
   a point of operation safety device for said press,
   said safety device including
      probe means for sensing an obstruction,
      beam means for supporting said probe means in an upper position,
      solenoid means for removing said beam means from supporting said probe means,
      switch means for energizing said solenoid means,
      relay means for energizing said solenoid control valves, and
      said electro-hydraulic control circuit including at least two timer means,
         one of said timer means holding the electrical circuit to the solenoid control valves closed for a predetermined time period, and
         the other of said timer means holding the electrical circuit closed to the solenoid means for removing said beam means from supporting said probe means for a predetermined time period which is less than the time period of one cycle of said press.

3. In a safety device for a press or the like, the combination of a probe means,
   first switch means actuatable by an operator,
   a first timer means energizable through said switch means,
   first normally closed contact means controlled by said first timer,
   solenoid safety means energizable through said switch means and said first contact means for releasing said probe means and permitting said probe means to move by gravity,
   first relay means comprising a relay coil and a first set of relay contacts, said first relay coil being energizable through said first switch means and through said first normally closed contact means,
   second switch means actuatable by said probe means when said probe means moves to a predetermined position,
   a second timer means including second normally open contacts,
   said second switch means having contact means for activating said second timer to close said normally open contacts,
   a second relay including a second relay coil and second and third sets of relay contacts, and
   solenoid valve means for controlling the ram of the press,
   whereupon closure of said relays energizes both said solenoid safety means and said solenoid valve means.

4. In a safety device for a press or the like
   a probe means movable by gravity from an upper position to a lower position,
   a beam pivoted at one end for moving said probe means at its other end from said lower position to said upper position,
   a compression spring means for pivoting said beam to said upper position,
   said spring means being disposed intermediate the ends of said beam,
   solenoid means including an armature axially aligned with said spring means for removing said beam from force transmitting relationship with said probe means, and
   switch means actuated by said probe means when said probe means is in its lower position to commence the cycle of the press or the like.

5. In a safety device for a press or the like the combination of
   probe means for testing the work area and movable from an upper position to a lower position by gravity,
   switch actuating means carried by said probe means,
   a switch actuated by said switch actuating means in said lower position,
   holding means for restraining said probe means in said lower position,
   said switch actuating means deactuating said switch when said probe means is moved above or below said lower position.

6. In a safety device for a press or the like the combination of
   probe means for testing the work area for obstructions movable from an upper position to a lower position by gravity,
   a cam carried by said probe means,
   a limit switch actuatable by said cam upon the descent of said probe means to said lower position,
   a spring biased follower engaging said cam to secure said probe means in said lower position,
   movement of said probe means up or down from said lower position, causing said cam to move away from said limit switch and causing it to reactuate.

7. A safety device for a press or the like comprising in combination a box including a base and a cover,
   a probe assembly including a shaft extending outwardly and downwardly of said box,
   a cam carried by said probe assembly,
   switch means within said box actuatable by said cam upon movement of said probe assembly from an upper position to a lower position, said cover being hinged to said base so that when said box is opened the cover will tend to drop by gravity so that a portion of said cover engages said shaft to restrain movement of said shaft and thereby prevent said cam from inadvertently actuating said switch.

8. The combination set forth in claim 6 and wherein said spring biased follower includes an arm supporting said follower,
   pivotal mounting means for said arm and a compression spring means,
   said follower being at one end of said arm and said compression spring means at the other end with said pivotal mounting means being disposed intermediate thereof.

9. A control circuit for a press or the like comprising
   a first timer including normally open first timer switch contacts which are closed by said first timer when a circuit to said timer is closed and opened when said circuit is reopened,
   a second timer,
   a solenoid means,
   probe means held in an upper position and movable to a lower position,
   first switch means for energizing said solenoid means and said second timer,
   a first limit switch means for activating said first timer,
   said second timer controlling a second switch means in series with said solenoid means,
   said second timer opening said second switch means after a predetermined time period to prevent reenergization of said solenoid unless said first switch means is reclosed,
   a first relay coil in series with said first switch means and said second switch means for opening and closing a first set of relay contacts,
   solenoid valve means,
   a second relay coil in series with said first timer switch contacts and with said first set of relay contacts,
   second limit switch means in series with said second relay coil, and
   said second relay coil having two pairs of relay contacts one of which is in series with said solenoid valve means and the other of which is in series with said first relay coil.

10. In a safety device for a press or the like
    a probe means movable by gravity from an upper position to a lower position,
    a beam pivoted at one end for moving said probe means at its other end from said lower position to said upper position,
    a spring means for pivoting said beam to said upper position
    said spring means being disposed intermediate the ends of said beam,
    solenoid means including an armature axially aligned with said spring means for removing said beam from force transmitting relationship with said probe means,
    switch means actuated by said probe means when said probe means is in its lower position to commence the cycle of the press or the like,
    said spring means including a compression spring and a guide rod,
    said guide rod being connected to a first clevis,
    said first clevis being pivotally connected to an arm,
    said first clevis and said arm being also pivotally connected to said beam,
    a second clevis being also pivotally connected to said first clevis and said arm, and
    said second clevis being also pivotally connected to said solenoid means.

* * * * *